Jan. 27, 1970   J. HOOGLAND   3,492,064
FIVE COMPONENT PHOTOGRAPHIC OBJECTIVE
Filed Nov. 25, 1966

INVENTOR.
Jan Hoogland
BY
Irving M. Kriegsman
ATTORNEY.

United States Patent Office 3,492,064
Patented Jan. 27, 1970

3,492,064
FIVE COMPONENT PHOTOGRAPHIC OBJECTIVE
Jan Hoogland, Wilton, Conn., assignor to The Perkin-Elmer Corporation, Norwalk, N.Y., a corporation of New York
Filed Nov. 25, 1966, Ser. No. 596,887
Int. Cl. G02b 9/60
U.S. Cl. 350—216   3 Claims

ABSTRACT OF THE DISCLOSURE

Zonal spherical aberration in a Plasmat type lens is substantially reduced by inserting a negative bioconcave component between the second and third components.

---

Figure 1:
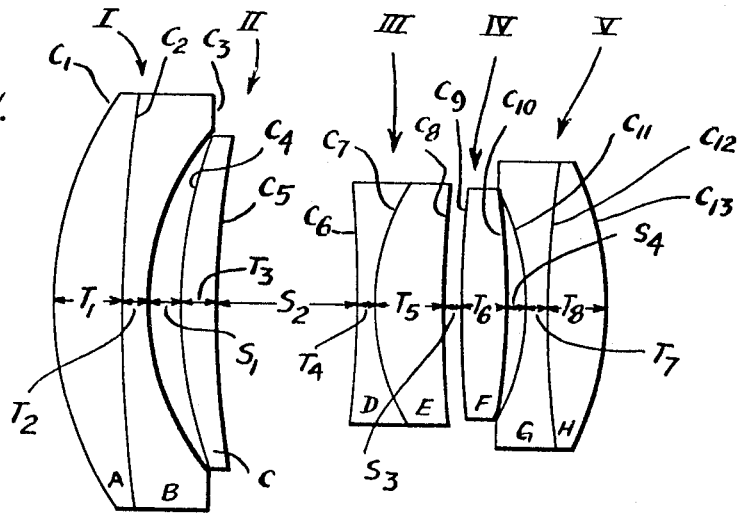

The present invention relates to photographic objectives. More particularly, the present invention relates to a five component objective which is especially suited for, but not exclusively limited to aerial photography.

It is an object of this invention to provide a new and improved photographic objective.

It is another object of this invention to provide a photographic objective that is compact, that has a moderately high aperture, and that covers a flat field of moderate extent.

It is still another object of this invention to provide a photographic objective of moderate aperture that is corrected for secondary spectrum and zonal spherical aberration as well as the usual field aberrations.

It is yet still another object of this invention to provide a photographic objective that is corrected for secondary spectrum and zonal spherical aberration and does not contain any aspheric surfaces.

It is another object of this invention to provide a new and improved five component photographic objective.

It is still another object of this invention to provide a photographic objective that is highly corrected for color aberration and uses relatively inexpensive materials.

The above and other objects as well as many attendant advantages thereof are achieved by means of a photographic objective constructed in accordance with this invention.

Briefly, the objective is a derivative of or improvement over a Plasmat type lens. As is well known in the art, a Plasmat is a four component objective in which the outer two components are meniscus shaped doublets concave toward each other and the inner two components are positive singlets whose outer surfaces are convex. One of the disadvantages of the Plasmat is that it suffers from severe zonal spherical aberration. According to this invention, the severe zonal spherical aberration inherent in the Plasmat is substantially reduced by adding a bioconcave negative component between the second and third components. This aberration is reduced without impairing the other advantages of the Plasmat. Another advantage realized by adding this component is that the first and fifth components need not be doublets, but may be singlets.

Basically, the photographic objective of the instant invention is made up of five components in optical axial alignment and separated by air spaces.

The front and rear components are meniscus shaped with their concave surfaces facing each other. Either or both of the front and rear components can be in the form of a single element, a cemented doublet or an uncemented doublet. The second and fourth components from the front are single elements and positive power. The front surface of the second component and the rear surface of the fourth component is convex. The third or central component is negative in power and double concave in shape. The third component can be either a singlet, a cemented doublet or an uncemented doublet. The diaphragm or stop position is located in the vicinity of the third component.

The curvatures of the front and rear surfaces of the front component and the curvatures of the front and rear surfaces of the rear component are, in absolute value, at least three times the power of the whole objective.

The absolute value of the power of the front and rear components is less than the power of the whole objective.

The vertex to vertex distance of the objective is between .25 and .45 times the effective focal length.

A clearer concept of the scope and purpose of the invention along with other advantages and features thereof will be obtained from the following detailed description taken in conjunction with the drawings, and the novel features will be particularly pointed out hereinafter in connection with the appended claims.

Figure 2:
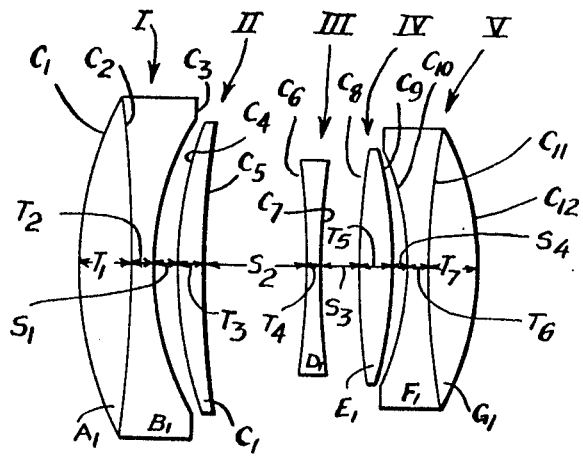

In the drawings:

FIGURE 1 is an optical diagram of one example of one embodiment of the invention; and FIGURE 2 is an optical diagram of one example of another embodiment of the invention.

Referring now to FIGURE 1, there is shown an example of one embodiment of a photographic objective constructed in accordance with this invention. In this embodiment the objective comprises five components including a doublet type third component. In the diagram, component (I) is at the front or object side of the objective and component (V) is at the rear or image side of the objective.

The first component (I) is meniscus shaped and convex toward the front. The curvatures of the front and rear surfaces of component (I) are in absolute value at least three times the power P of the whole objective. The absolute value of the power of component (I) is less than the power P of the whole objective. The first component (I) consists of a positive element A having a convex surface toward the front and a negative element B having a concave surface away from the front. The second component (II) is positive and consists of a single element C having a convex surface toward the front. The third component (III) is negative in power and double concave in shape. The third component (III) consists of a double concave element D and a positive meniscus element E. The fourth component (IV) is positive and consists of a single element F having a convex surface away from the front. The fifth component (V) is meniscus shaped and concave toward the front. The curvatures of the front and rear surfaces of component (V) are in absolute value at least three times the power P of the whole objective. The absolute value of the power of component (V) is less than the power P of the whole objective. The fifth component (V) consists of a negative element G having a concave surface facing the front and a positive element H having a convex surface away from the front.

The diaphragm or stop position is located in the vicinity of the third component (III).

The following table shows the constructional data for one example of a photographic objective constructed according to the embodiment shown in FIGURE 1. As is well known in the art, the curvature of a surface is equal to the reciprocal of its radius. In the table, the various components are designated by Roman numerals in ascending order from the front to the rear of the objective with the light assumed to come from the front of the objective. The curvatures of the surfaces $C_1$ to $C_{13}$ are marked plus or minus depending on whether the surfaces are convex or concave respectively toward the incoming light.

two examples of a photographic objective constructed according to this embodiment.

TABLE I

Focal Length=1.0000; Relative Aperture=F/5.6
Total Field of View=30°
Front Vertex Distance (F.V.D.)=1.2400
Back Focal Length (B.F.)=.8318
Stop Position is at Surface $C_6$

| Component | Lens | Curvature | Thickness or Spacing | Refractive Index, $Nd$ | Abbe No., $v$ |
|---|---|---|---|---|---|
| I | A | $C_1=3.9459$ | $T_1=.0500$ | 1.6968 | 55.6 |
|   | B | $C_2=.8716$ | $T_2=.0200$ | 1.5814 | 40.8 |
|   |   | $C_3=5.2532$ | $S_1=.0250$ | Air |   |
| II | C | $C_4=2.7398$ | $T_3=.0250$ | 1.6968 | 55.6 |
|   |   | $C_5=1.4200$ | $S_2=.1039$ | Air |   |
|   |   | $C_6=-.8987$ |   |   |   |
| III | D | $C_7=6.0394$ | $T_4=.0150$ | 1.6228 | 56.9 |
|   | E | $C_8=1.6224$ | $T_5=.0500$ | 1.5920 | 48.5 |
|   |   | $C_9=.1746$ | $S_3=.0224$ | Air |   |
| IV | F | $C_{10}=-2.0657$ | $T_6=.0250$ | 1.6968 | 55.6 |
|   |   | $C_{11}=-4.8938$ | $S_4=.0120$ | Air |   |
| V | G | $C_{12}=1.4548$ | $T_7=.0200$ | 1.5814 | 40.8 |
|   | H | $C_{13}=-4.1136$ | $T_8=.0400$ | 1.6968 | 55.6 |

TABLE II

Focal Length=1.0000; Relative Aperture=F/5.6
Total Field of View=30°
Front Vertex Distance (F.V.D.)=1.1581
Back Focal Length (B.F.)=.8651
Stop Position is at Surface $C_7$

| Component | Lens | Curvature | Thickness or Spacing | Refractive Index, $Nd$ | Abbe No., $v$ |
|---|---|---|---|---|---|
| I | A | $C_1=3.8722$ | $T_1=.0400$ | 1.6204 | 60.3 |
|   | B | $C_2=-1.0856$ | $T_2=.0120$ | 1.5294 | 51.8 |
|   |   | $C_3=5.1200$ | $S_1=.0180$ | Air |   |
| II | C | $C_4=3.6461$ | $T_3=.0200$ | 1.6204 | 60.3 |
|   |   | $C_5=1.3134$ | $S_2=.0745$ | Air |   |
| III | D | $C_6=-1.9956$ | $T_4=.0150$ | 1.6584 | 50.9 |
|   |   | $C_7=2.5255$ | $S_3=.0335$ | Air |   |
| IV | E | $C_8=.2081$ | $T_5=.0200$ | 1.6204 | 60.3 |
|   |   | $C_9=-3.1972$ | $S_4=.0160$ | Air |   |
| V | F | $C_{10}=-5.2221$ | $T_6=.0100$ | 1.5294 | 51.8 |
|   | G | $C_{11}=2.3543$ | $T_7=.0350$ | 1.6204 | 60.3 |
|   |   | $C_{12}=-4.3328$ |   |   |   |

Referring now to FIGURE 2, there is shown an example of another embodiment of a photographic objective constructed in accordance with this invention. In this embodiment, the objective comprises five components including a single element third component. In the diagram, component (I) is at the front or object side and component (V) is at the rear or image side of the objective.

The first component (I) is meniscus shaped and convex toward the front. The curvatures of the front and rear surfaces of component (I) are in absolute value at least three times the power P of the whole objective. The absolute value of the power of front component (I) is less than the power P of the whole objective. The first component (I) consists of a positive element $A_1$ having a convex surface toward the front and a negative element $B_1$ having a concave surface away from the front. The second component (II) is positive and consists of a single element $C_1$ having a convex surface toward the front. The third component (III) consists of a single element $D_1$, negative in power and double concave in shape. The fourth component (IV) is positive and consists of a single element $E_1$ having a convex surface away from the front. The fifth component (V) is meniscus shaped and concave toward the front. The curvatures of the front and rear surfaces of component (V) are in absolute value at least three times the power P of the whole objective. The absolute value of the power of component (V) is less than the power P of the whole objective. The fifth component (V) consists of a negative element $F_1$ having a concave surface facing the front and a positive element $G_1$ having a convex surface away from the front.

The diaphragm or stop position is located in the vicinity of the third component (III).

The following tables show the constructional data for

TABLE III

Focal Length=1.0000; Relative Aperture=F/5.6
Total Field of View=30°
Front Vertex Distance (F.V.D.)=1.1569
Back Focal Length (B.F.)=.8679
Stop Position=.0076 After Surface $C_7$

| Component | Lens | Curvature | Thickness or Spacing | Refractive Index, $Nd$ | Abbe No., $v$ |
|---|---|---|---|---|---|
| I | A | $C_1=3.8792$ | $T_1=.0400$ | 1.6204 | 60.3 |
|   | B | $C_2=-1.3243$ | $T_2=.0150$ | 1.5294 | 51.8 |
|   |   | $C_3=5.1456$ | $S_1=.0103$ | Air |   |
| II | C | $C_4=3.6576$ | $T_3=.0200$ | 1.6204 | 60.3 |
|   |   | $C_5=1.2945$ | $S_2=.0737$ | Air |   |
| III | D | $C_6=-2.0410$ | $T_4=.0100$ | 1.6584 | 50.9 |
|   |   | $C_7=2.5305$ | $S_3=.0381$ | Air |   |
| IV | E | $C_8=.2046$ | $T_5=.0200$ | 1.6204 | 60.3 |
|   |   | $C_9=-3.1868$ | $S_4=.0120$ | Air |   |
| V | F | $C_{10}=-5.2453$ | $T_6=.0150$ | 1.5294 | 51.8 |
|   | G | $C_{11}=2.3127$ | $T_7=.0350$ | 1.6204 | 60.3 |
|   |   | $C_{13}=-4.3431$ |   |   |   |

I claim:
1. An objective made substantially according to the following specifications, wherein the components are desig- nated by Roman numerals in ascending order from the front to the rear:

TABLE I

Focal Length=1.0000; Relative Aperture=F/5.6
Total Field of View=30°
Front Vertex Distance (F.V.D.)=1.2400
Back Focal Length (B.F.)=.8318
Stop Position is at Surface $C_8$

| Component | Lens | Curvature | Thickness or Spacing | Refractive Index, $N_d$ | Abbe No., $v$ |
|---|---|---|---|---|---|
| I | A | $C_1=3.9459$ | $T_1=.0500$ | 1.6968 | 55.6 |
|  | B | $C_2=.8716$ | $T_2=.0200$ | 1.5814 | 40.8 |
|  |  | $C_3=5.2532$ | $S_1=.0250$ | Air |  |
| II | C | $C_4=2.7398$ | $T_3=.0250$ | 1.6968 | 55.6 |
|  |  | $C_5=1.4200$ | $S_2=.1039$ | Air |  |
| III | D | $C_6=-.8987$ | $T_4=.0150$ | 1.6228 | 56.9 |
|  | E | $C_7=6.0394$ | $T_5=.0500$ | 1.5920 | 48.5 |
|  |  | $C_8=1.6224$ | $S_3=.0224$ | Air |  |
| IV | F | $C_9=.1746$ | $T_6=.0250$ | 1.6968 | 55.6 |
|  |  | $C_{10}=-2.0657$ | $S_4=.0120$ | Air |  |
|  |  | $C_{11}=-4.8938$ | $T_7=.0200$ | 1.5814 | 40.8 |
| V | G | $C_{12}=1.4548$ | $T_8=.0400$ | 1.6968 | 55.6 |
|  | H | $C_{13}=-4.1126$ |  |  |  |

2. An objective made substantially according to the following specifications wherein the components are designated by Roman numerals in ascending order from the front to the rear:

TABLE II

Focal Length=1.0000; Relative Aperture=F/5.6
Total Field of View=30°
Front Vertex Distance (F.V.D.)=1.1581
Back Focal Length (B.F.)=.8651
Stop Position is at Surface $C_7$

| Component | Lens | Curvature | Thickness or Spacing | Refractive Index, $N_d$ | Abbe No., $v$ |
|---|---|---|---|---|---|
| I | A | $C_1=3.8722$ | $T_1=.0400$ | 1.6204 | 60.3 |
|  | B | $C_2=-1.0856$ | $T_2=.0120$ | 1.5294 | 51.8 |
|  |  | $C_3=5.1200$ | $S_1=.0180$ | Air |  |
| II | C | $C_4=3.6461$ | $T_3=.0200$ | 1.6204 | 60.3 |
|  |  | $C_5=1.3134$ | $S_2=.0745$ | Air |  |
| III | D | $C_6=-1.9956$ | $T_4=.0150$ | 1.6584 | 50.9 |
|  |  | $C_7=2.5255$ | $S_3=.0335$ | Air |  |
| IV | E | $C_8=.2081$ | $T_5=.0200$ | 1.6204 | 60.3 |
|  |  | $C_9=-3.1972$ | $S_4=.0160$ | Air |  |
|  |  | $C_{10}=-5.2221$ |  |  |  |
| V | F | $C_{11}=2.3543$ | $T_6=.0100$ | 1.5294 | 51.8 |
|  | G | $C_{12}=-4.3328$ | $T_7=.0350$ | 1.6204 | 60.3 |

3. An objective made substantially according to the following specifications, wherein the components are designated by Roman numerals in ascending order from the front to the rear:

TABLE III

Focal Length=1.0000; Relative Aperture=F/5.6
Total Field of View=30°
Front Vertex Distance (F.V.D.)=1.1569
Back Focal Length (B.F.)=.8679
Stop Position=.0076 After Surface $C_7$

| Component | Lens | Curvature | Thickness or Spacing | Refractive Index, $N_d$ | Abbe No., $v$ |
|---|---|---|---|---|---|
| I | A | $C_1=3.8792$ | $T_1=.0400$ | 1.6204 | 60.3 |
|  | B | $C_2=-1.3243$ | $T_2=.0150$ | 1.5294 | 51.8 |
|  |  | $C_3=5.1456$ | $S_1=.0103$ | Air |  |
| II | C | $C_4=3.6576$ | $T_3=.0200$ | 1.6204 | 60.3 |
|  |  | $C_5=1.2945$ | $S_2=.0737$ | Air |  |
| III | D | $C_6=-2.0410$ | $T_4=.0100$ | 1.6584 | 50.9 |
|  |  | $C_7=2.5305$ | $S_3=.0381$ | Air |  |
| IV | E | $C_8=.2046$ | $T_5=.0200$ | 1.6204 | 60.3 |
|  |  | $C_9=-3.1868$ | $S_4=.0120$ | Air |  |
|  |  | $C_{10}=-5.2453$ |  |  |  |
| V | F | $C_{11}=2.3127$ | $T_6=.0150$ | 1.5294 | 51.8 |
|  | G | $C_{12}=-4.3431$ | $T_7=.0350$ | 1.6204 | 60.3 |

References Cited

UNITED STATES PATENTS

| 871,559 | 11/1907 | Beck | 350—216 |
| 2,548,569 | 4/1951 | Tolle | 350—216 X |
| 2,664,783 | 1/1954 | Cook | 350—219 |
| 2,730,017 | 1/1956 | Tronnier | 350—216 |
| 3,133,983 | 5/1964 | Rickless et al. | 350—16 X |

FOREIGN PATENTS

| 153,379 | 5/1962 | U.S.S.R. |

PAUL R. GILLIAM, Primary Examiner